Patented Aug. 5, 1952

2,606,163

UNITED STATES PATENT OFFICE 2,606,163

INTERPOLYMERS OF STYRENE WITH STYRENE-BUTADIENE COPOLYMERS

Earl D. Morris and Gerald A. Griess, Midland, Mich., assignors to The Dow Chemical Company, Midland, Mich., a corporation of Delaware No Drawing. Application January 5, 1949, Serial No. 69,414

15 Claims. (Cl. 260—23)

This invention concerns certain new interpolymers of major amounts of styrene and minor amounts of rubbery polymeric derivatives of aliphatic conjugated diolefines. It also concerns a method of making the interpolymers as solid thermoplastic resinous materials which are less brittle than polystyrene and which withstand milling and molding operations without undergoing appreciable weakening or embrittlement.

The interpolymers provided by the invention comprise, in chemically combined form, from 98 to 85 parts by weight of styrene and from 1 to 15 parts of a rubbery polymeric derivative of an aliphatic conjugated diolefine having from 4 to 6 carbon atoms in the diolefine molecule. When properly prepared, the interpolymers are translucent and nearly white, have good tensile strength and have impact strength and per cent elongation values far greater than those of polystyrene. Also, when properly prepared, they may be milled, alone or together with pigments, fillers or other usual addition agents, at heat plastifying temperatures, and may be molded into accurately dimensioned articles without becoming brittle, or discolored, or weakened. Because of their resistance to breakage under impact, they are in many instances preferred over polystyrene in making molded articles.

The interpolymers are prepared by polymerizing en masse a solution, in styrene, of a minor amount of an unsaturated rubbery copolymer of a conjugated diolefine, e. g. a copolymer of styrene and butadiene. However, the polymerization reaction is highly exothermic and spontaneous overheating with impairment of the properties of the product being formed tends to occur. Apparently the rubbery component of the solution undergoes decomposition or molecular degradation when the mixture becomes heated to 175° C. or higher for a considerable time, e. g. 10 hours or longer. Also, the rubbery component causes thickening of the mixture in the early stages of the polymerization reaction, so that withdrawal of heat from the mixture at the rate necessary to prevent overheating is more difficult than when polymerizing styrene alone. The problem of controlling the temperature to avoid overheating becomes more difficult with increase in the quantity of the solution being polymerized and in general is serious when polymerizing one gallon batches or larger of the solution. Overheating during the polymerization results in formation of a product which is discolored and brittle, or which undergoes weakening, discoloration and embrittlement when mechanically worked at a heat-plastifying temperature.

Overheating may, of course, be avoided by carrying the polymerization out very slowly, e. g. at room temperature or thereabout, but such procedure would probably require a month or more for the polymerization reaction and is not feasible for manufacture of the product. Overheating may also be avoided by carrying the polymerization out in an inert liquid reaction medium, e. g. an organic solvent, but this necessitates extra and troublesome steps for removing the liquid from the product.

It is an object of this invention to provide a method whereby the aforementioned solutions in styrene of a synthetic rubber may be polymerized en masse without excessive overheating to form a non-brittle, moldable polymer capable of withstanding a usual milling operation without becoming weakened, discolored or embrittled. Another object is to provide the aforementioned new interpolymers of styrene and minor amounts of the rubbery polymeric derivatives of diolefines. Still other objects will be apparent from the following description of the invention.

We have found that the tendency toward spontaneous overheating during the above-discussed interpolymerization reaction may be reduced greatly by initially adding to the polymerization mixture from 0.5 to 5.0 per cent by weight of higher fatty acids having 12 or more carbon atoms in the molecule, or preferably one or more esters of such fatty acids and of lower aliphatic alcohols. The alcohol radical of such ester may be that of a monohydric alcohol or of a polyhydric alcohol, such as ethylene glycol, propylene glycol, diethylene glycol, glycerol, sorbitol, or pentaerythritol, etc. Frequently, a mixture of such esters of a monohydric alcohol and of a polyhydric alcohol is employed. Examples of esters which may be used for the purpose are linseed oil, soyabean oil, ethylene glycol distearate, diethylene glycol distearate, refined animal fats, ethylene glycol dipalmitate, propylene glycol dipalmitate, glycerol tristearate, glycerol tripalmitate, pentaerythritol tetrastearate, sorbitan tetralaurate, ethylene glycol dilaurate, ethyl stearate, propyl stearate, isopropyl stearate, butyl stearate, butyl palmitate, amyl stearate, or amyl palmitate, etc. In place of the esters, free fatty acids such as lauric acid, tetradecanoic acid, palmitic acid, or stearic acid, or mixtures of one or more of the free fatty acids and one or more of the esters, may be used. All of the higher acids and esters thereof just mentioned as suitable for use in the invention are ones wherein the acid radical is substantially free of conjugated olefinic linkages.

The interpolymerization reaction is preferably carried out in the presence of an organic peroxide catalyst, e. g. acetyl peroxide, benzoyl peroxide, or lauroyl peroxide, but it may be accomplished in the absence of a catalyst, or using other usual polymerization catalysts. A variety of organic peroxides suitable for use in the reaction are known. A peroxide is usually used in amounts corresponding to from 0.01 and 0.1, preferably between 0.02 and 0.06, per cent of the combined weight of the materials to be interpolymerized.

In preparing the interpolymer, from 1 to 15 parts by weight of an unsaturated rubbery polymeric derivative of a conjugated diolefine is dissolved in from 98 to 85 parts of styrene, and the solution is preferably filtered to remove any undissolved rubbery material or other solids. Examples of synthetic rubbers which may be used in the reaction are the rubbery copolymers of styrene and butadiene, of acrylonitrile and butadiene, of styrene and isoprene, of acrylonitrile and isoprene, or of styrene and 2,3-dimethyl-butadiene, etc. A number of other unsaturated rubbery derivatives of unconjugated diolefines are known. Any such rubbery material may be used in the process.

From 0.5 to 5.0 parts by weight of one or more of the aforementioned higher fatty acids, or saturated esters of the higher fatty acids, usually a mixture of such esters of a monohydric alcohol and of a polyhydric alcohol, is added to the solution of styrene and the rubbery material. From 0.02 to 0.06 part of an organic peroxide, e. g. benzoyl peroxide or lauroyl peroxide, is preferably also added, but is not required. This order of mixing the several ingredients of the solution is not critical and may be varied, e. g. the esters and catalyst may be dissolved in styrene prior to adding the rubbery material thereto.

The mixture is heated in a closed vessel at temperatures between 50° and 100° C. until approximately half, e. g. from 40 to 60 per cent, of the styrene is consumed by the polymerization reaction. The mixture is then heated at temperatures of from 100° to 175° C., preferably from 130° to 160° C. for completion of the reaction. As the reaction occurs and the mixture thereby becomes thickened, withdrawal of heat generated by the reaction becomes increasingly difficult until a major portion of the styrene has been consumed. As a consequence, there is a tendency, usually when about half of the styrene has been consumed, for the temperature of the mixture to rise sharply and spontaneously, e. g. to above 200° C. Such spontaneous heating does not seriously impair the properties of the polymer being formed in instances in which the temperature is prevented from rising above 175° C. for more than 10 hours and from exceeding 240° C., but greater or more extensive overheating is detrimental and usually weakens and causes embrittlement of the product. The temperature is controlled in usual ways, e. g. by means of a surrounding bath of a temperature-control fluid such as oil or water, or by passage of such fluid through coils immersed in the reaction mixture, etc. Usually, the mixture is heated over a period of from 5 to 10 days in carrying out the polymerization reaction.

After completing the polymerization, the vessel is opened and the product removed. If desired, the product may be devolatilized in usual ways, e. g. by heating the same under vacuum, to remove any unpolymerized styrene or other volatile components, but this usually is not necessary.

The polymeric product is a white, or nearly white, translucent thermoplastic resin which may be molded directly into non-brittle articles of good strength. Peculiarly, the impact strength, tensile strength and per cent elongation values of the product may be improved by a limited amount of mechanical working of the same at heat-plastifying temperatures for a time insufficient to cause decomposition or more than a minor amount of molecular degradation. Accordingly, the mixture is usually milled, e. g. on heated compounding rolls at temperatures between 100° and 200° C. for from 5 to 30 minutes prior to being molded. The amount of mechanical working required to bring the properties of the mixture to optimum values varies somewhat depending on the exact composition of the product and the conditions under which it was prepared, but are readily determined for a given product. Once the optimum milling conditions are determined, they may be reemployed in mechanically working subsequent batches of a given polymeric product. In some instances, the working of the interpolymer has been accomplished by mechanical stirring of the reaction mixture during the polymerization. It is believed that a limited amount of cross-linking between the polymer molecules occurs during the polymerization reaction and that the subsequent mechanical working breaks the cross-linkages and thereby causes the improvement in properties, but the invention is not restricted to this theory. Excessive mechanical working may cause a general molecular degradation of the product and impair its properties.

The following examples describe ways in which the invention has been practiced and illustrate certain of its advantages, but are not to be construed as limiting the invention.

EXAMPLE 1

Approximately 90 pounds of a solution of 93 parts by weight of styrene, 5 parts of a solid rubbery copolymer of about 80 per cent by weight of butadiene-1,3 and 20 per cent of styrene, 1 part of a nearly saturated refined animal fat rich in glycerol stearate, 1 part of n-butyl stearate and 0.02 part of benzoyl peroxide was sealed in a container provided with a thermometer well. The container was heated in a water bath maintained at 65° C. and the temperature near the center of the polymerization mixture was periodically observed. Approximately 90 hours after immersion of the container in the bath the temperature of the polymerization mixture increased sharply from below 175° C. to about 210° C. and then decreased rapidly. It is estimated that the mixture was at temperatures above 175° C. for about 5 hours. When the mixture had cooled to 100° C. or thereabout, i. e. 96 hours after the start of heating, the bath temperature was increased to 95° C. Twenty-four hours later, the bath was brought to a temperature of 150° C. and it was maintained at that temperature for 72 hours. The container was then removed from the bath, opened, and the polymeric product was removed and ground to particles suitable for molding. A portion of the product was molded into test pieces suitable for determination of its strength characteristics. Another portion was mechanically worked for 10 minutes on a pair of compounding rolls, each of 3 inches diameter, one of which rolls was internally heated to approximately 116° C. and the other to approximately 166° C. The milled material was then molded into similar test pieces. The impact strength in inch-pounds per pair of samples and the tensile strength in pounds per square inch of cross sectional area of a test piece were then determined for the unmilled and the milled polymeric product in accordance with standard testing procedures. The polymer test pieces used in determining each of the properties, except the impact strength, were bars of square cross section and having dimensions of 2⅛ inches x ¼ inch x ¼ inch. In determining each impact strength, a pair of test bars of square cross section, each having dimensions of 1 1/16 inches x ⅛ inch x ⅛ inch, and positioned side by side were simultaneously struck with a hammer and the inch-pounds of energy necessary to break the pair of bars was the value determined. Except for these conditions, the procedure is that conventionally used in the Izod determination of impact strengths. The portion of the product which had been molded directly without preliminary mechanical working had an impact strength of 3.6 inch-pounds per test piece and a tensile strength of 6480 pounds per square inch. The product which was milled and then molded into test pieces had an impact strength of 4.0 inch-pounds per sample and a tensile strength of 7540 pounds per square inch.

EXAMPLE 2

In each of five experiments, 5 parts of a rubbery interpolymer of 80 per cent butadiene and 20 per cent styrene was dissolved in from 90 to 95 parts of monomeric styrene, 0.03 part of benzoyl peroxide was added, and the solution was polymerized. The experiments differed from one another in that only the materials just mentioned were used in one of the polymerization reactions, whereas n-butyl stearate, or soyabean oil, or a mixture thereof was added prior to carrying out the other polymerizations. Each polymerization was accomplished by heating the reaction mixture to a temperature of 93° C. for 13 days, then at a temperature of 150° C. for 2 days. Each polymeric product was milled for 10 minutes on heated compounding rolls, then molded into test pieces and tested to determine its tensile strength and per cent elongation values, as described in Example 1. The Izod impact strengths were determined using in each test a single bar of square cross section and having dimensions of 2⅛ inches x ¼ inch x ¼ inch. Each impact strength is expressed as foot-pounds of energy required to break a test bar. Certain of the test bars used in the impact strength determinations were provided with a transverse notch of 0.015 inch depth across one side-face along a line midway between the ends of the bar. The following table identifies each product by indicating the parts by weight of styrene, and also of butyl stearate or soyabean oil, used in preparing the same and gives the properties which are determined for the product. Impact values are given both for notched and unnotched test bars.

*Table I*

| Run No. | Starting Mixture Contained— | | | Properties of Product— | | | |
|---|---|---|---|---|---|---|---|
| | Styrene Pts. | Butyl Stearate Pts. | Soyabean Oil-Pts. | Impact Strength | | Tensile Strength lbs./sq. in. | Percent Elongation |
| | | | | Notched Bar— ft.-lbs. | Unnotched Bar— ft.-lbs. | | |
| 1 | 95 | None | None | 0.133 | 0.69 | 6,050 | 3.7 |
| 2 | 93 | None | 2 | 0.34 | 1.33 | 5,100 | 18.5 |
| 3 | 93 | 1 | 1 | 0.31 | 1.25 | 5,410 | 13.2 |
| 4 | 93 | 2 | None | 0.25 | 0.64 | 5,130 | 10.0 |
| 5 | 90 | 5 | None | 0.27 | 0.77 | 3,580 | 11.6 |

EXAMPLE 3

In each of a series of experiments a solution of 5 parts by weight of the rubbery copolymer of 80 per cent butadiene and 20 per cent styrene, 0.03 part of benzoyl peroxide, and monomeric styrene, butyl stearate and soyabean oil, in the proportions expressed as parts by weight in Table II, was polymerized. Each polymerization was accomplished by heating the reaction mixture at 65° C. for 17 days, at 70° C. for 1 day, at 75° C. for 2 days, at 80° C. for 5 days, at 95° C. for 2 days, and at 150° C. for 3 days. One portion of each polymeric product was molded directly into test pieces, as described in Example 2, which were used in determining its mechanical properties. Another portion of each product was milled for 10 minutes on heated compounding rolls as described in Example 1, then molded into test pieces and its properties were determined as in Example 2. Table II gives the proportions of styrene, butyl stearate and soyabean oil used in each experiment and gives the properties which were determined for the unmilled, and for the milled, product.

*Table II*

| Run No. | Starting Mixture Contained— | | | Polymeric Product— | | | | |
|---|---|---|---|---|---|---|---|---|
| | Styrene Pts. | Butyl Stearate Pts. | Soyabean Oil Pts. | Condition When Molded | Properties | | | |
| | | | | | Impact Strength | | Tensile Strength lbs./sq. in. | Percent Elongation |
| | | | | | Notched Bar— ft.-lbs. | Unnotched Bar— ft.-lbs. | | |
| 1 | 93 | 1 | 1 | Unmilled | 0.39 | 0.8 | 3,900 | 4.89 |
| | | | | Milled | 0.225 | 0.88 | 5,450 | 26.0 |
| 2 | 92 | 1.5 | 1.5 | Unmilled | 0.27 | 0.8 | 3,700 | 7.07 |
| | | | | Milled | 0.312 | 1.13 | 5,060 | 33.6 |
| 3 | 91 | 2 | 2 | Unmilled | 0.26 | 0.8 | 3,140 | 8.44 |
| | | | | Milled | 0.298 | 1.19 | 4,540 | 33.3 |

EXAMPLE 4

In each of a series of experiments, a solution of about 0.03 part by weight of benzoyl peroxide, 5 parts of a rubbery copolymer of styrene and butadiene similar to that employed in the preceding examples, from 92.5 to 93.6 parts of styrene and the addition agents named in Table III in the parts by weight given, was polymerized. Similar polymerization conditions were employed in all of the experiments. Each product was milled, as in Example 1, then molded into test pieces. The test pieces were used in determining the mechanical properties of the product as in Example 2. The table names, and gives the proportions of, the addition agents used in each experiment. It also gives the properties determined for each product.

Table III

| Run No. | Addition Agents— Kinds | Pts. | Properties of Products— Impact Strength Notched Bar—ft.-lbs. | Unnotched Bar—ft.-lbs. | Percent Elongation |
|---|---|---|---|---|---|
| 1 | Soyabean Oil / Stearic Acid | 1 / 0.2 | 0.32 | 1.48 | 36.4 |
| 2 | Soyabean Oil / Stearic Acid | 1 / 0.4 | 0.27 | 1.34 | 35.8 |
| 3 | Soyabean Oil / Stearic Acid | 1 / 0.6 | 0.29 | 1.77 | 39.0 |
| 4 | Soyabean Oil / Stearic Acid | 1 / 1 | 0.23 | 1.42 | 40.3 |
| 5 | Soyabean Oil / Stearic Acid | 1 / 1.5 | 0.22 | 1.23 | 36.0 |
| 6 | Soyabean Oil / Butyl Stearate | 1 / 1 | 0.26 | 1.11 | 40.2 |

EXAMPLE 5

In each of a series of experiments, a solution of from 88 to 97 parts of styrene, from 1 to 10 parts of a rubbery copolymer of butadiene and acrylonitrile, 1 part of soyabean oil, 1 part of butyl stearate and 0.03 part of benzoyl peroxide was polymerized. Certain of the polymerizations were carried out by heating the mixture at 70° C. for 504 hours and then at 150° C. for 72 hours. In Table IV this procedure is referred to as "schedule A." In another experiment a "schedule B" was employed. It consisted of heating the mixture at 80° C. for 24 hours; then at 70° C. until there was a spontaneous temperature rise to 198° C. followed by a decrease in temperature; then at 85° C. for 24 hours and finally at 150° C. for 72 hours. A further "schedule C," which involved heating the mixture at 70° C. until the temperature increased sharply and spontaneously to 170° C. and then decreased; next at 85° C. for 24 hours; and finally at 150° C. for 72 hours. Certain of the experiments also differed from others as to the relative proportions of styrene and acrylonitrile chemically combined in the rubbery starting material. After completing each polymerization reaction, the product was milled on heated rolls for 10 minutes, as in Example 1. It was then molded into test pieces, and its properties were determined, as in Example 2. Table IV gives the per cent by weight of acrylonitrile chemically combined in the rubbery starting material. It also gives the parts by weight of styrene and of the rubbery material present in each polymerization mixture and indicates which polymerization schedule was used. It also gives the properties of each product. In the table, the symbol "VCN" stands for acrylonitrile.

Table IV

| Run No. | Percent VCN in Rubbery Reactant | Starting Mixture Contains— Styrene Pts. | Rubbery Reactant Pts. | Polymerization Schedule | Properties of Product— Impact Strength Notched Bar—ft.-lbs. | Unnotched Bar—ft.-lbs. | Tensile Strength lbs./sq. in. | Percent Elongation |
|---|---|---|---|---|---|---|---|---|
| 1 | 26 | 97 | 1 | A | 0.23 | 0.74 | 7,470 | 4.36 |
| 2 | 26 | 96 | 2 | A | 0.25 | 0.71 | 6,730 | 4.84 |
| 3 | 26 | 95 | 3 | A | 0.25 | 0.87 | 6,120 | 4.22 |
| 4 | 26 | 94 | 4 | A | 0.33 | 0.76 | 5,325 | 3.42 |
| 5 | 26 | 93 | 5 | A | 0.30 | 0.79 | 5,250 | 4.22 |
| 6 | 26 | 88 | 10 | A | 0.27 | 0.53 | 3,180 | 6.05 |
| 7 | 18 | 95 | 3 | B | 0.23 | 1.22 | 5,610 | 15.8 |
| 8 | 18 | 95 | 3 | C | 0.19 | 1.20 | 5,780 | 16.3 |

In the following claims the term "polymer" is employed generically and pertains to copolymers as well as homopolymers.

Other modes of applying the principle of the invention may be employed instead of those explained, change being made as regards the method or products herein disclosed, provided the steps or materials stated by any of the following claims or the equivalent of such stated steps or materials be employed.

We therefore particularly point out and distinctly claim as our invention:

1. In a method of interpolymerizing styrene with an unsaturated rubbery polymer of an aliphatic conjugated diolefine, having from 4 to 6 carbon atoms in the diolefine molecule, the steps which consist in heating a solution, comprising from 98 to 85 parts by weight of styrene, from 1 to 15 parts of the unsaturated rubbery reactant, and from 0.5 to 5 parts of at least one addition agent of the class consisting of higher fatty acids, substantially free of conjugated olefinic linkages and containing at least twelve carbon atoms in the molecule, and esters of such higher fatty acids with unsubstituted saturated lower aliphatic alcohols, containing less than seven carbon atoms in the molecule, in a closed vessel at temperatures between 50° and 100° C. until approximately half of the styrene is polymerized and thereafter bringing the mixture to temperatures between 100° and 240° C., while preventing the mixture from becoming heated to temperatures above 175° C. for more than 10 hours during the reaction.

2. A method, as described in claim 1, wherein the addition agent consists of at least one ester of a higher fatty acid and a saturated lower aliphatic alcohol.

3. A method, as described in claim 1, wherein the addition agent comprises an ester of a higher fatty acid and a saturated lower polyhydric aliphatic alcohol.

4. A method, as described in claim 1, wherein the rubbery reactant is a copolymer of styrene and butadiene.

5. A method, as described in claim 1, wherein the addition agent comprises an ester of a higher fatty acid and a saturated lower polyhydric aliphatic alcohol and the rubbery reactant is a copolymer of styrene and butadiene.

6. A method, as described in claim 1, wherein the interpolymer is mechanically worked at a heat-plastifying temperature for a time insufficient to cause appreciable decomposition of the same.

7. A method, as described in claim 1, wherein the rubbery reactant is a copolymer of butadiene and acrylonitrile.

8. A method, as described in claim 1, wherein the addition agent comprises an ester of a higher fatty acid and a saturated lower polyhydric aliphatic alcohol and the rubbery reactant is a copolymer of butadiene and acrylonitrile and the polymer is mechanically worked at a heat-plastifying temperature for a time insufficient to cause appreciable decomposition of the same.

9. A solid thermoplastic interpolymer of from 98 to 85 parts by weight of styrene and from 1 to 15 parts of an unsaturated polymeric derivative of an aliphatic conjugated diolefine having from 4 to 6 carbon atoms in the diolefine molecule, which interpolymer is prepared by polymerizing styrene and an unsaturated rubbery polymer of an aliphatic conjugated diolefine having from 4 to 6 carbon atoms in the diolefine molecule, while in admixture with one another and an ester of a higher fatty acid, having at least 12 carbon atoms in the acid radical, and an unsubstituted saturated lower aliphatic alcohol having less than 7 carbon atoms in the alcohol radical, which ester is substantially free of conjugated olefinic linkages, the polymerization being accomplished at temperatures between 50° and 240° C. while preventing the mixture from becoming heated above 175° C. for more than 10 hours during the reaction, and which interpolymer retains from 0.5 to 5 per cent by weight of said ester incorporated therewith.

10. A solid thermoplastic interpolymer of from 98 to 85 parts by weight of styrene and from 1 to 15 parts of an unsaturated rubber copolymer of styrene and butadiene, which interpolymer is prepared by polymerizing styrene and an unsaturated rubbery copolymer of styrene and butadiene in admixture with one another and an ester of a higher fatty acid, having at least 12 carbon atoms in the acid radical, and an unsubstituted saturated lower aliphatic alcohol having less than 7 carbon atoms in the alcohol radical, which ester is substantially free of conjugated olefinic linkages, the polymerization being accomplished at temperatures between 50° and 240° C. while preventing the mixture from becoming heated to above 175° C. for more than 10 hours during the reaction, and which interpolymer retains from 0.5 to 5 per cent by weight of said ester incorporated therewith.

11. A solid thermoplastic interpolymer of from 98 to 85 parts by weight of styrene and from 1 to 15 parts of an unsaturated rubbery copolymer of butadiene and acrylonitrile, which interpolymer is prepared by polymerizing styrene and an unsaturated rubbery copolymer of butadiene and acrylonitrile in admixture with one another and an ester of a higher fatty acid, having at least 12 carbon atoms in the acid radical, and an unsubstituted saturated lower aliphatic alcohol having less than 7 carbon atoms in the alcohol radical, which ester is substantially free of conjugated olefinic linkages, the polymerization being accomplished at temperatures between 50° and 240° C. while preventing the mixture from becoming heated to above 175° C. for more than 10 hours during the reaction, and which interpolymer retains from 0.5 to 5 per cent by weight of said ester incorporated therewith.

12. A mechanically worked composition, as described in claim 9.

13. A mechanically worked composition, as described in claim 10.

14. A mechanically worked composition, as described in claim 11.

15. In a method of interpolymerizing styrene with an unsaturated rubbery copolymer of styrene and butadiene, the steps which consist in heating a solution, comprising from 98 to 85 parts by weight of styrene, from 1 to 15 parts of the unsaturated rubbery copolymer of styrene and butadiene, and from 0.5 to 5 parts of at least one addition agent of the class consisting of higher fatty acids, substantially free of conjugated olefinic linkages and containing at least twelve carbon atoms in the molecule, and esters of such higher fatty acids with unsubstituted saturated aliphatic alcohols containing less than seven carbon atoms in the molecule, in a closed vessel at temperatures between 50° and 100° C. until approximately half of the styrene is polymerized, thereafter bringing the mixture to temperatures between 100° and 240° C., while preventing the mixture from becoming heated to temperatures above 175° C. for more than 10 hours during the reaction, and mechanically working the resultant interpolymer at a heat-plastifying temperature for a time insufficient to cause appreciable decomposition of the same.

EARL D. MORRIS.
GERALD A. GRIESS.

REFERENCES CITED

The following references are of record in the file of this patent:

UNITED STATES PATENTS

| Number | Name | Date |
|---|---|---|
| 2,190,906 | Stoesser et al. | Feb. 20, 1940 |
| 2,284,335 | Meyer | May 26, 1942 |
| 2,356,965 | Allison | Aug. 29, 1944 |
| 2,382,498 | Morley | Aug. 14, 1945 |
| 2,460,300 | Le Fevre et al. | Feb. 1, 1949 |
| 2,485,592 | Griess et al. | Oct. 25, 1949 |

FOREIGN PATENTS

| Number | Country | Date |
|---|---|---|
| 578,915 | Great Britain | July 17, 1946 |